H. F. LANGENHOP.
GRATE.
APPLICATION FILED FEB. 6, 1914.

1,114,488.

Patented Oct. 20, 1914.
3 SHEETS—SHEET 1.

Witnesses

Inventor
Herman F. Langenhop
By
Victor J. Evans
Attorney

H. F. LANGENHOP.
GRATE.
APPLICATION FILED FEB. 6, 1914.

1,114,488.

Patented Oct. 20, 1914.
3 SHEETS—SHEET 2.

Witnesses
Inventor
H. F. Langenhop
Victor J. Evans
Attorney

H. F. LANGENHOP.
GRATE.
APPLICATION FILED FEB. 6, 1914.
1,114,488.
Patented Oct. 20, 1914.
3 SHEETS—SHEET 3.
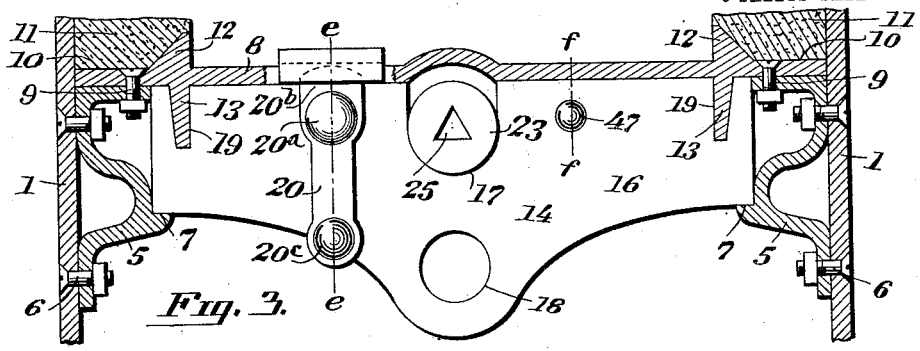
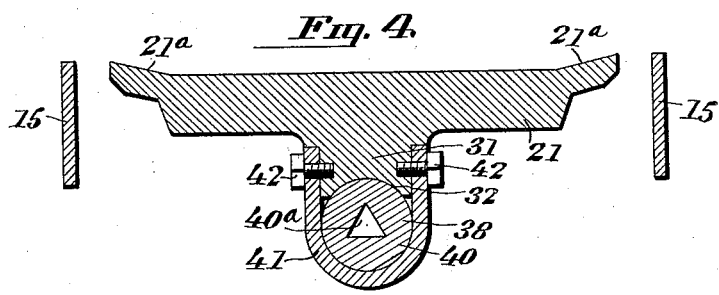
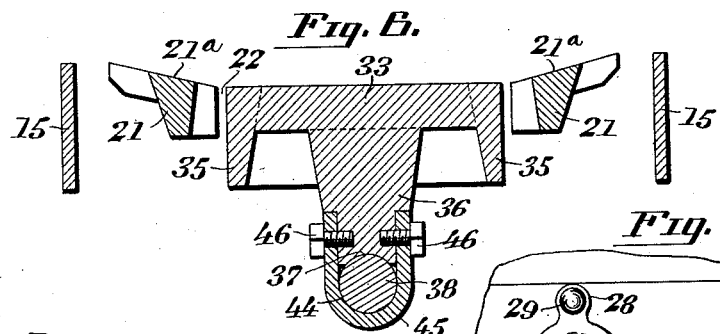
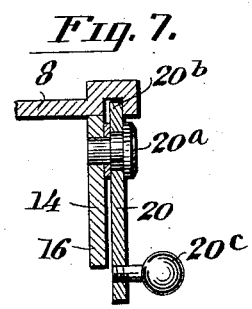
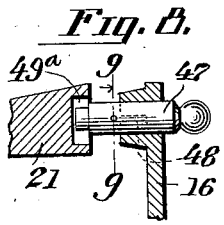
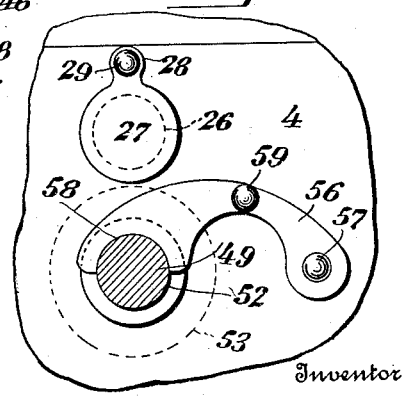
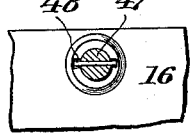
Witnesses
Inventor
Herman F. Langenhop
By Victor J. Evans
Attorney

UNITED STATES PATENT OFFICE.

HERMAN F. LANGENHOP, OF NEW YORK, N. Y.

GRATE.

1,114,488.  Specification of Letters Patent.  Patented Oct. 20, 1914.

Application filed February 6, 1914. Serial No. 816,871.

*To all whom it may concern:*

Be it known that I, HERMAN F. LANGENHOP, a citizen of the United States, residing at New York, in the county of New York and State of New York, have invented new and useful Improvements in Grates, of which the following is a specification.

This invention is an improved grate for use in ranges, cook-stoves, heaters and steam hot water furnaces generally and which may be easily and conveniently shaken to clear the same of ashes or turned to dumping position to discharge accumulations of cinders and the like thereon and consists in the construction, combination and arrangement of devices hereinafter described and claimed.

This invention is an improvement on the grate described and claimed in my copending application for Letters-Patent of the United States, Serial No. 730,950, filed Nov. 12, 1912, and allowed Aug. 19, 1913.

Figure 1:
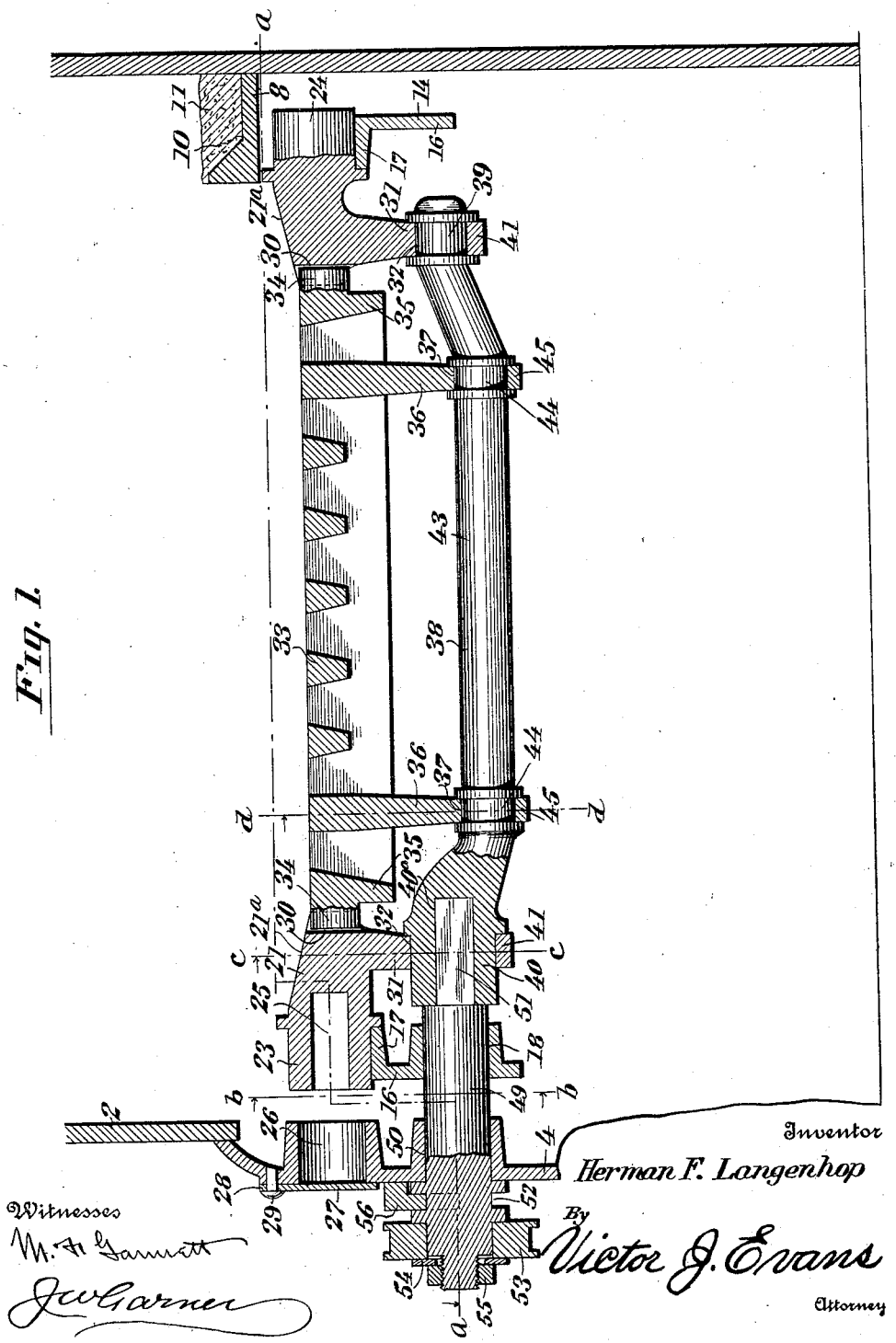
Figure 2:
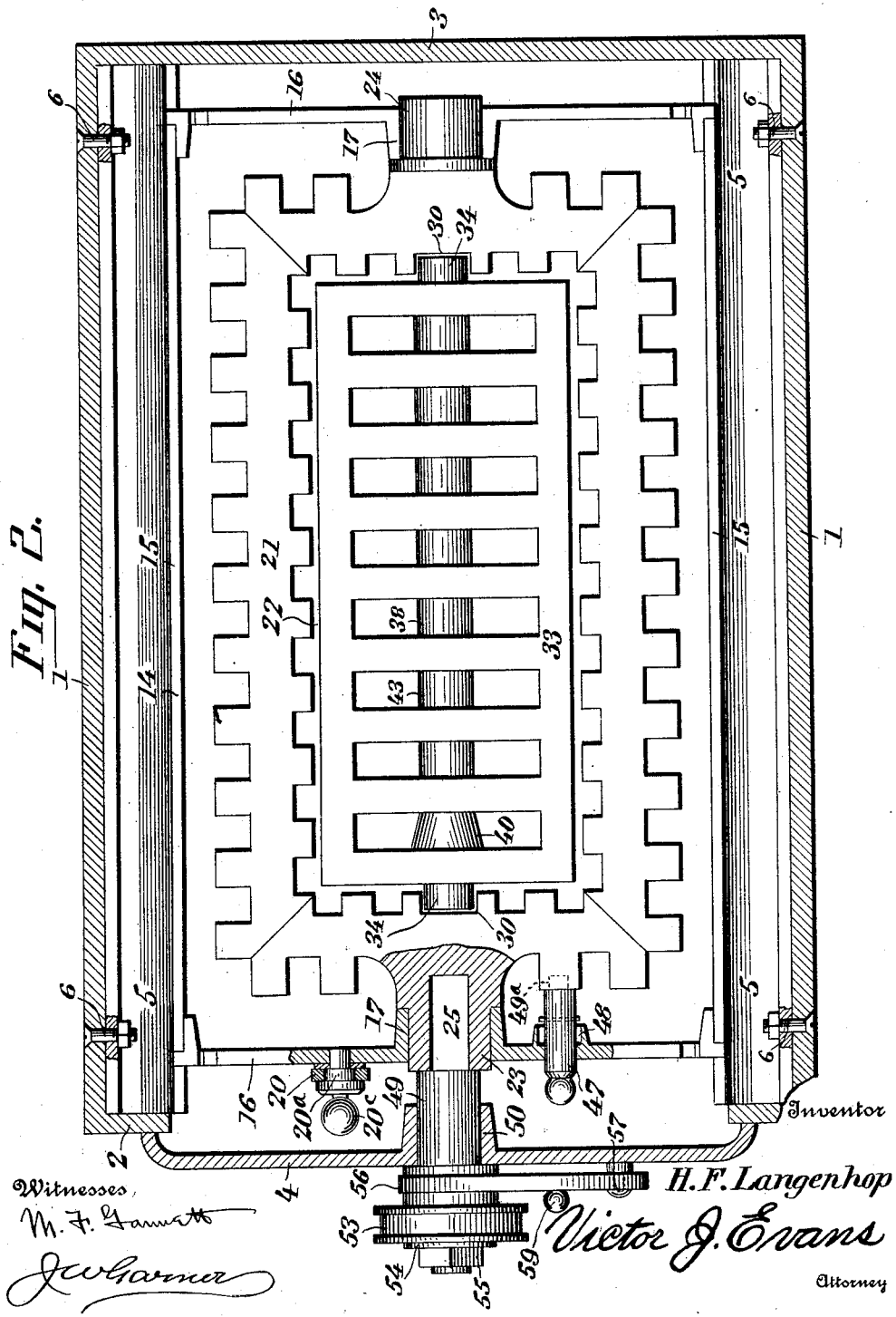

In the accompanying drawings:—Figure 1 is a vertical transverse sectional view of the lower portion of a furnace provided with my improved grate. Fig. 2 is a horizontal sectional view of the same on the plane indicated by the line $a$—$a$ of Fig. 1 and showing the grate in plan and arranged within the carrier frame. Fig. 3 is a vertical transverse sectional view on the plane indicated by the line $b$—$b$ of Fig. 1. Fig. 4 is a similar view on the plane indicated by the line $c$—$c$ of Fig. 1. Fig. 5 is a detail front elevation. Fig. 6 is a detail sectional view on the plane indicated by the line $d$—$d$ of Fig. 1. Fig. 7 is a similar view on the plane indicated by the line $e$—$e$ of Fig. 3. Fig. 8 is a similar view on the plane indicated by the line $f$—$f$ of Fig. 7. Fig. 9 is a similar view on the plane indicated by the line $g$—$g$ of Fig. 8.

For the purposes of this specification the side walls of a lower portion of a furnace are here indicated at 1, the front wall at 2, the rear wall at 3 and the door to the ash pit at 4. Brackets 5 are bolted to the inner sides of the side walls 1 as at 6 and the said brackets are provided in their opposing sides with shoulders 7. These brackets support a channel frame 8 which is secured thereon by means of bolts 9. The channel frame has channels 10 in its sides to receive the lower ends of suitable fire bricks 11, the inner walls of the said channels forming flanges 12. The said channel frame is provided at its sides with depending guide lugs 13.

A carrier frame 14 is provided which is rectangular in form and comprises a pair of side bars 15 and a pair of end bars 16. In the centers of the end bars of the carrier frame are bearings 17 and the front bar of the carrier frame also has a lower bearing 18. The sides of the carrier frame are arranged between the brackets 5 and bear on the shoulders 7 of said brackets, the carrier frame being arranged below the channel frame and being provided in its sides with upwardly opening grooves 19 which are engaged by the lugs 13 of said channel frame. Hence the carrier frame and the grates carried thereby, as will presently appear, may be readily removed from under the channel frame, out through the door opening in the front wall of the furnace and may also readily be installed in place as will be understood. A drop catch 20 is provided to hold the carrier frame in place. This catch is pivotally mounted on a pin $20^a$, has a shoulder $20^b$ at one end to engage the channel frame and is provided near the opposite end with a crank handle $20^c$ which also forms a weight and normally holds the catch in vertical position with its upper shoulder or end $20^b$ engaging the channel frame and thereby securing the carrier frame in place. By first turning the catch 20 to a horizontal position, to disengage its shoulder $20^b$ from the channel frame, the carrier frame may be released and the carrier frame, together with the weights carried thereby may be removed.

Within the carrier frame is a tiltable outer grate 21 which is here shown as rectangular in form and is provided with a rectangular central opening 22. The sides and ends of the grate are inclined as at $21^a$ so that the inner portion of the grate 21 is depressed as shown. At the ends of the grate 21 are trunnions 23—24 which are respectively mounted in the front and rear bearings 17 of the carrier frame. The trunnion 23 has a socket 25 to receive a suitable shaker which may be inserted through an opening 26 in the door 4. A drop closure 27 is provided for the said opening which is here shown as circular in form and has an arm 28 at its upper side pivotally mounted on a stud or rivet 29 which projects from the door, the closure being thereby adapted by its own gravity to close the opening 26. On the inner sides of its end bars, at the centers thereof, are vertical guideways 30 in the outer grate. The outer grate is also provided at its ends with centrally arranged integral hangers 31 each of which has a semi-circular bearing recess 32 in its lower end.

An inner grate 33 which is here shown as of oblong rectangular form is arranged within the opening 22 of the outer grate 21 and is provided at its ends with centrally arranged guide and pivot bosses 34 which engage in the guide-ways 30 of the outer grate and hence connect the inner grate to the outer grate for vertical movement and also for rocking movement. The inner grate 33 is provided at its sides with depending guide lugs 35 and the inner grate is also provided, near its ends, with centrally arranged hangers or rock arms 36 which are provided with substantially semi-circular bearing recesses 37 in their lower ends. The inner grate is normally arranged in the depressed central portion of the grate 21 and is supported by a shaft 38 which is provided at its rear end with a journal 39 mounted in the rear bearing recess 31 and at its front end with a socketed trunnion 40 which is mounted in the front bearing recess 31. U-shaped bearing straps 41 are provided which pass around the lower sides of said journal and trunnion and the arms of which are secured to the hangers 31 by bolts 42, the said bearing straps coacting with the recesses 32 to form the bearings for said trunnion and journal of the shaft 38. This shaft is formed with a crank 43 which is provided near its ends with annular bearing grooves 44 engaged with the lower ends of the hangers or rock arms 36 of the inner grate 33 and also engaged by U-shaped bearing straps 45 with which the said hangers are provided, said straps being secured by bolts 46.

It will be understood from the foregoing that the outer grate may be rocked and caused to rock the inner grate therewith, the inner grate partaking of the rocking movement of the outer grate. The extent of the rocking movement of the outer grate is controlled by a pin 47 which operates in a slot 48 in the front bar or side 16 of the carrier frame, and this pin may be removed if desired.

The outer grate has a vertical slot 49ᵃ for engagement by the inner end of the pin 47 the slot permitting, but limiting the rocking movement of the outer grate.

When the shaft 38 is rotated its crank 43 coacts with the hangers 36 to raise and lower the inner grate and to also rock the inner grate. Hence the outer grate may be rocked and the inner grate caused to rock firmly therewith or the outer grate may be permitted to remain stationary and the inner grate caused to rock and to also describe vertical movement within the outer grate and hence the burning coals may be thoroughly shaken and agitated to clear them of clinkers and ashes and to promote combustions.

When the outer grate is in normal horizontal position the socketed trunnion 40 of the shaft 38 is operated and concentric with the lower bearing 18 and hence a suitable device may be inserted through said bearing and engaged with the socket 40ᵃ in order to turn the shaft 38 and hence operate the inner grate.

To enable the inner grate to be operated by electric or other power I provide a shaft 49 which is mounted in a bearing 50 in the door and which is adapted also to be arranged in the bearing 18 and has an angular stem 51 at its inner end to engage the socket 40ᵃ. This shaft 49 is provided at a point slightly spaced from the front side of the door with an annular groove 52 and is also provided with a power wheel or pulley 53 for engagement by an endless power chain or belt of an electric or other suitable motor for driving the shaft 49 and hence also the shaft 38. This pulley 53 is secured by a washer 54 and a nut 55. A catch 56 is provided which is pivotally mounted at one end on the front side of the door 4 as at 57 and is provided at its opposite end, on the under side, with a semi-circular recess 58 adapting the said end of the catch to engage the groove 52 of the shaft 49 and hence lock the latter against endwise movement and thereby secure it in the bearings 50 and 18. To enable the catch to be readily removed to engaged or disengaged position I provide the same with a thumb piece or knob 59. The drop closure 27 normally lies above the catch 56 and keeps the latter in engaged position. By first swinging the said closure out of the way the said catch 56 may be raised to disengage the groove 52 and hence permit the removal of the shaft 49 from the bearings 18 and 50, thus disengaging said shaft 38 when this is desired.

Having thus described my invention, I claim:—

1. In a structure of the class described, a channel frame having depending guide lugs at its sides, supports for the channel frame, a carrier frame mounted on said supports, arranged below the channel frame and having grooves in its upper side engaged by the lugs of the channel frame, an outer grate having centrally arranged supports at its ends mounted in bearings in the carrier frame and also provided with vertical guides and with hangers, a crank shaft mounted in said hangers and an inner grate having pivots in its ends mounted for vertical movement in the guides of the outer grate, and also having depending rock arms engaged with the crank of said crank shaft.

2. In a structure of the class described, a channel frame having depending guide lugs at its sides, supports for the channel frame, a carrier frame slidably mounted on said supports, arranged below the channel frame and having grooves in its upper side engaged by the lugs of the channel frame, an outer grate having centrally arranged supports at its ends mounted in bearings in the carrier frame and also provided with vertical guides and with hangers, a crank shaft mounted in said hangers and an inner grate having pivots in its ends mounted for vertical movement in the guides of the outer grate, and also having depending rock arms engaged with the crank of said crank shaft.

3. In a structure of the class described, a channel frame having depending guide lugs at its sides, supports for the channel frame, a carrier frame mounted on said supports, arranged below the channel frame and having grooves in its upper side engaged by the lugs of the channel frame, an outer grate having centrally arranged supports at its ends mounted in bearings in the carrier frame and also provided with vertical guides and with hangers, a crank shaft mounted in said hangers and an inner grate having pivots in its ends mounted for vertical movement in the guides of the outer grate, and also having depending rock arms engaged with the crank of said crank shaft, means to limit the extent of rocking movement of the outer grate and means to limit the extent of rocking movement of the inner grate.

4. In a structure of the class described, a channel frame having depending guide lugs at its sides, supports for the channel frame, a carrier frame mounted on said supports, arranged below the channel frame and having grooves in its upper side engaged by the lugs of the channel frame, an outer grate having centrally arranged supports at its ends mounted in the bearings in the carrier frame and also provided with vertical guides and with hangers, a crank shaft mounted in said hangers and an inner grate having pivots in its ends mounted for vertical movement in the guides of the outer grate, and also having depending rock arms engaged with the crank of said crank shaft, the front end of the crank shaft and the front outer grate support having shaker engaging means, and said carrier frame having an opening in its front side affording access to the front end of the crank shaft.

5. In a structure of the class described, a channel frame having depending guide lugs at its sides, supports for the channel frame, a carrier frame mounted on said supports, arranged below the channel frame and having grooves in its upper side engaged by the lugs of the channel frame, an outer grate having centrally arranged supports at its ends mounted in the bearings in the carrier frame and also provided with vertical guides and with hangers, a crank shaft mounted in said hangers and an inner grate having pivots in its ends mounted for vertical movement in the guides of the outer grate, and also having depending rock arms engaged with the crank of said crank shaft, the front end of the crank shaft and the front outer grate support having shaker engaging means, and said carrier frame having a bearing opening in its front side affording access to the front end of the crank shaft.

6. In a structure of the class described, a channel frame having depending guide lugs at its sides, supports for the channel frame, a carrier frame mounted on said supports, arranged below the channel frame and having grooves in its upper side engaged by the lugs of the channel frame, an outer grate having centrally arranged supports at its ends mounted in bearings in the carrier frame and also provided with vertical guides and with hangers, a crank shaft mounted in said hangers and an inner grate having pivots in its ends mounted for vertical movement in the guides of the outer grate, and also having depending rock arms engaged with the crank of said crank shaft, means to limit the extent of rocking movement of the outer grate and means to limit the extent of rocking movement of the inner grate, a door, and an operating shaft mounted in a bearing in the door and engaging the front end of the crank shaft.

7. In a structure of the class described, a channel frame having depending guide lugs at its sides, supports for the channel frame, a carrier frame mounted on said supports, arranged below the channel frame and having grooves in its upper side engaged by the lugs of the channel frame, an outer grate having centrally arranged supports at its ends mounted in bearings in the carrier frame and also provided with vertical guides and with hangers, a crank shaft mounted in said hangers and an inner grate having pivots in its ends mounted for vertical movement in the guides of the outer grate, and also having depending rock arms engaged with the crank of said crank shaft, means to limit the extent of rocking movement of the outer grate and means to limit the extent of the rocking movement of the inner grate, a door and an operating shaft mounted in a bearing in the door and engaging the front end of the crank shaft, and means to detachably secure said operating shaft in its bearing in the door.

In testimony whereof I affix my signature in presence of two witnesses.

HERMAN F. LANGENHOP.

Witnesses:
 WILLIAM BUEHLERP,
 GEORGE T. COCHRAN.